May 3, 1960 A. CHAUSSON 2,935,629
ELECTROMAGNETICALLY ENERGIZED MECHANISM
Filed Oct. 26, 1956 2 Sheets-Sheet 1

INVENTOR
André Chausson
BY Alvin Browdy
ATTORNEY

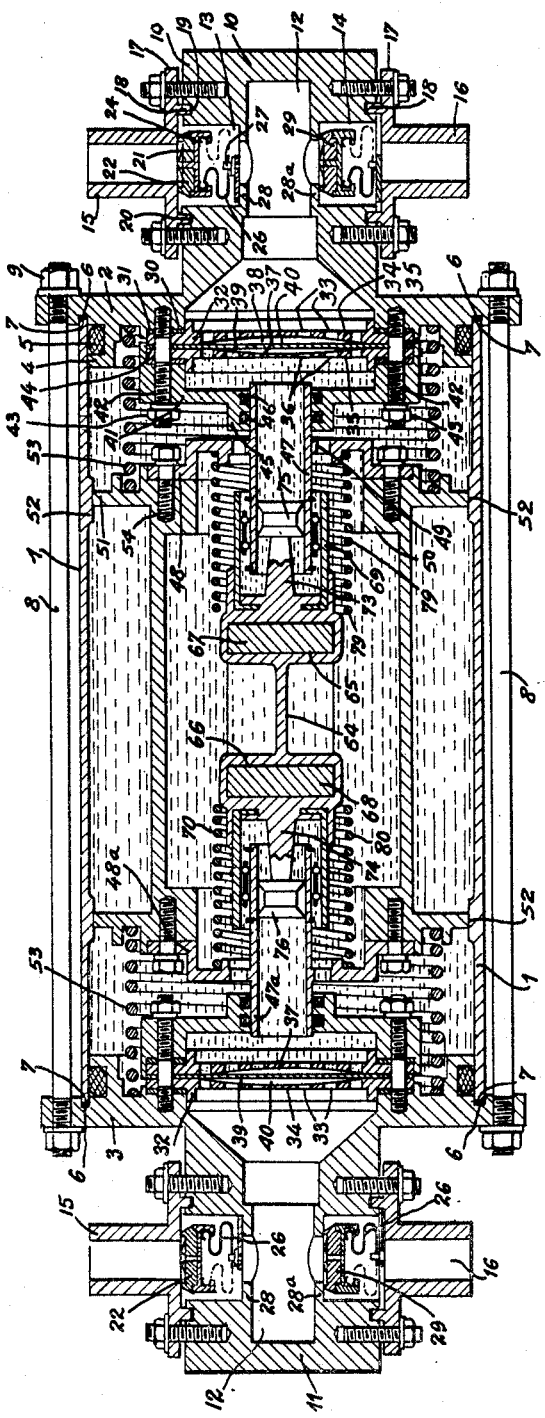

United States Patent Office 2,935,629
Patented May 3, 1960

2,935,629

ELECTROMAGNETICALLY ENERGIZED MECHANISM

André Chausson, Asnieres, France, assignor to Societe Anonyme des Usines Chausson, Asnieres, Seine, France, a company of France Application October 26, 1956, Serial No. 618,587

Claims priority, application France October 29, 1955

6 Claims. (Cl. 310—27)

The present invention relates to a new electromagnetically energized mechanism particularly intended to enable various fluids to circulate, such as liquids, and also to enable the compression of gaseous fluids to be effected in one or two stages.

The particular arrangement of the mechanism according to the invention makes it possible to ensure the putting of liquids, even very corrosive ones, into circulation, and this, whatever the pressure under which these liquids already exist.

Furthermore, the arrangement of the various members of the mechanism also makes it possible to obtain an extremely silent working appliance, that does not run the risk of heating up and in which the lubrication of the moving parts takes place automatically.

According to the invention, the mechanism is characterized by a tubular cover closed at its ends by pump bodies and distortable diaphragms activated by a liquid contained in the cover and displaced by pistons integral with a longitudinally mobile armature in an alternating manner under the influence of an alternating magnetic field set up in a magnetic circuit capable of vibrating inside the cover filled with liquid against the action of springs.

Various other characteristics of the invention will moreover be revealed by the detailed description which follows.

Forms of embodiment of the achievement of the device according to the invention are shown, by way of non-restrictive examples, in the attached drawings.

Fig. 2 is an elevation section similar to Fig. 1, but taken along the line II—II of the latter figure.

Figure 1:
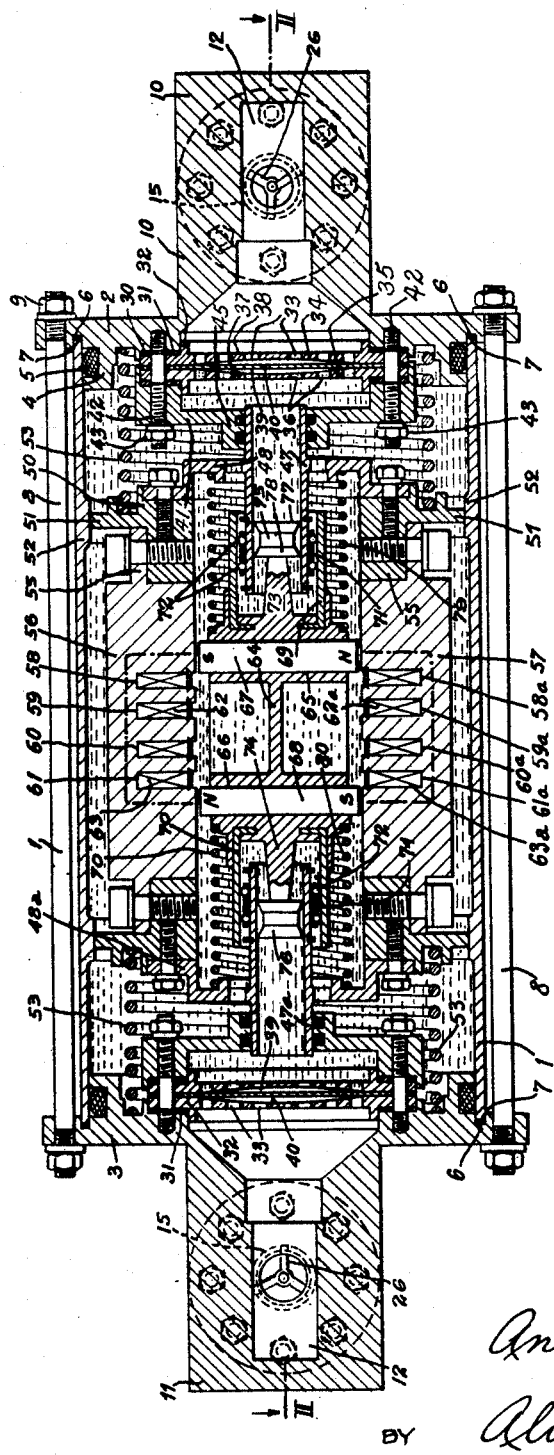
Fig. 1 is a longitudinal elevation section illustrating one form of embodiment of the device for pumping and compressing various fluids, according to the invention.

The device shown in the drawings comprises a cover 1, for example, made in the shape of a tubular element. This cover is closed at both ends by end plates 2, 3. The end plates 2, 3 are provided with edges 4 fitting into the cover 1 and having a groove for housing a tight-fitting toric washer 5. Moreover, the end plates comprise grooves 6 into which the ends of the cover 1 enter, said ends securing an annular washer 7 when said end plates 2, 3 are themselves tightened by means of tie-rods 8 with threaded ends, on to which nuts 9 are screwed.

The end plates 2, 3 form pump bodies 10 and 11 from their respective external faces which define chambers 12 therein.

As will be seen from Fig. 2, each pump body has an intake duct 13 and a delivery duct 14 which communicate with tubular shoulders 15, 16, having flanges 18 entering into grooves 19 of the pump bodies and tightening the tight-fitting washers 20 in the bottom of these grooves.

The intake duct 13 is normally closed by a valve 21. The bottom of the valve has an annular housing 24 into which are inserted one end 25 shaped like knuckles, of resilient elements 26 arranged in star-shape and bearing by their free end on a support 27 held on a bearing 28 made by the pump bodies.

The particular form of embodiment of the valves described above enables them to be mounted without the necessity of providing guiding members, whilst allowing these valves always to have a perfect bearing against their seating.

The delivery valve 29 which is placed in the duct 14 of each pump body, is advantageously made in a similar manner to that described above, but its mounting is inverted, i.e., the edge of the flexible sleeve 22 presses against the bearing 28a of each pump body, instead of bearing against the underneath of the sole 17 of the tubular shoulder.

The internal faces of each of the two end plates 2 and 3 form bearings 30 against which plates 32 in which holes 33 are drilled, press through the intermediary of tight-fitting washers 31.

The face of each of the plates 32 which is opposed to that pressing against the bearings 30, is shaped so as to form a substantially hemispherical concavity 34.

35 designates a second plate similar to the plate 32 and provided, like the latter, with holes 36 as well as a concave face 37.

The housing formed by each of the plates 32 and 35 is divided into two compartments 38, 39 by a flexible diaphragm 40 which is secured at its periphery between the two said plates 32 and 35.

The plates 32 and 35 are held against each other by means of an annular crown 41 whose peripherical edge partly fits into these plates. The tightening of said plates, by the annular crown 41, is obtained by means of screws and nuts 42, 43, which act to connect the plates 32, 35 and crown 41 assembly to each of the two end plates 2, 3.

So that a tight fit is absolute, it is advantageous to insert, between the crown 41 and the periphery of the plate 35, a tight-fitting washer 44 similar to the washer 31.

The central part of each crown 41 forms a sleeve 45 provided internally with tight-fitting packing 46. The sleeve of each of the crowns acts for respectively holding the cylinders 47, 47a which are thus aligned with each other.

Each of the cylinders 47 and 47a is provided on its external face with an annular flange 48, 48a that is drilled with holes 49, and acts to support a frame 50. The frame 50 includes annular elements 51 which press against annular bearings 52 which are located on the internal surface of the cover 1.

In actual practice, the frame 51 is provided with an easy fit inside the cover 1, so that this frame can oscillate to a certain extent. In order to limit the amplitude of the movement that may occur during the operating of the frame device 50 and to ensure its centering inside the cover 1, springs 52 and 53 are inserted between the annular elements 51 and each of the two end plates 2 and 3.

The frame 51, which is fixed to the periphery of the annular flanges 48 and 48a by the screws 54, is advantageously made of non magnetic material but conductive of current, and supports elements 56 and 57 of a magnetic circuit by the lugs 55 (Fig. 1).

The two elements 56 and 57 of the magnetic circuit are magnetically insulated from each other by the frame 50 which carries them and they respectively comprise transversal notches or slots 58 to 61 and 58a to 61a.

The slots 59, 60 act as a housing for a first coil 62 and the slots 58, 61 as a housing for a second coil 63; likewise, the slots 59a, 60a act as a housing for a coil 62a, whereas the slots 61a, 58a act as housing for the coil 63a.

The coils 62 to 63a are intended to be fed by fixed frequency alternating current and are advantageously mounted in series with each other.

It is possible that the coils 62 to 63a are all wound in the same direction and fed so that at a given time t, the coils 62 and 63 define a polarity, north for example, whereas at the same moment the coils 62a and 63a define a south polarity.

The magnetic circuit described above is intended to act as inductor for an armature formed by an armature or shuttle 64 which, in the form of embodiment shown, is made of non magnetic material that is nevertheless conductive of electricity, such as aluminium alloy. This armature or shuttle is preferably designed so that it has a mass as light as possible in order to reduce the inertia of the moving parts.

The armature or shuttle 64 carries permanent magnets 67, 68 at each of its ends, which are embedded in housings 65, 66, made in the shape of rods whose ends are rounded so that the air-gaps between them and the elements 56, 57 of the magnetic circuit, are as small as possible.

The magnets 67 and 68 are mounted so that their polarity is opposed, these polarities being, for example, those shown on the drawing by the letters S.N.

The armature or shuttle 64 has sleeves 69, 70 at each of its ends, advantageously made of steel, one of whose ends is, for example, embedded in the material of which the armature or shuttle is made during its manufacture, which is preferably done by moulding.

As will be seen from the drawing, the sleeves 69, 70 are concentric to the cylinders 47, 47a which they surround.

71 designates rings provided with balls 72 which are inserted between each of the cylinders 47, 47a and each of the sleeves 69, 70 so that the latter and hence the armature or shuttle 64 are guided and so that the movement of said shuttle takes place practically without friction.

At each of its ends, the shuttle 64 forms piston rods 73, 74 on whose ends pistons 75, 76 are mounted, comprising a metal armature provided on each of its two sides, with flexible sleeves 77, 78, turning their concavity in opposite directions, so that the pistons 75, 76 work like double-acting pistons.

The sleeves of flexible material utilised in manufacturing pistons are, for example, made of synthetic material, such as that known by the name of "Perbunan."

In order that the movable unit, formed by the shuttle 64 and the pistons 75, 76 that it controls when it reciprocates, has a well-defined vibration frequency, springs 79, 80 are inserted between each of the ends of the shuttle and each of the annular flanges 48, 48a.

The strength of these springs as well as the mass of the shuttle and the members that it controls and supports are selected so that the vibration frequency of the mobile unit thus formed, is slightly less than the frequency of the alternating feed current of the coils 62 to 63a, so that this mobile unit oscillates in synchronism with the frequency of the feed current but is not in tune with this frequency, the deviation between the two frequencies being nevertheless small.

As will be seen from the drawing, the position occupied by the permanent magnets 67, 68 when the shuttle is at its middle position, which corresponds to its rest position, is such that the magnets are placed beyond the end coils, so that the permanent magnetic field of the magnets closes, as shown by the dotted line, by each of the two elements 56, 57 of the magnetic circuit.

When the inductive coils of the magnetic circuit are fed as has been explained above, they set up an alternating field which, during a complete cycle of alternating feed current, reaches a maximum, becomes annulled, then reverses in each coil, which has the effect, as the polarities of the magnets 67, 68 are fixed, of attracting and then repelling these magnets alternately in one direction and then in the other, by taking along the shuttle 64 and the pistons 75, 76 in the same movement.

The enclosure delimited by the cover 1 and the end plates 2, 3 is completely filled with an incompressible liquid, such as oil, so that the pistons 75, 76, when driven, move quantities of oil corresponding to the stroke that they make in the cylinders 47, 47a in which they slide.

The masses of oil thus displaced have the effect of successively acting on the diaphragms 40 which are then distorted between the two concave walls 37, 38 of the perforated plates 32 and 35.

The diameter of the cylinders 47, 47a is substantially smaller than the diameter of the diaphragms 40 and the stroke of the pistons is consequently considerable, although the distortion which is imparted to the diaphragms is small.

When the device described above is intended to be used as a pump, the chambers 12 of the pump bodies 10, 11, are completely filled with liquid fluid and consequently the distortions undergone by the diaphragms have the effect of imputting, then delivering, for each working cycle of the shuttle 64 a certain quantity of fluid through the tubular shoulders 15, 16 which are connected to piping for inputting and delivering the liquid fluid to be put into circulation.

During the working of the device and as already explained, the shuttle 64 is driven in a fixed frequency alternating movement. Consequently, the frame that surrounds it and to which it is connected by springs 79, 80 which bear against the annular cheeks 48, 48a, is also driven in an alternating movement but dephased by 180° with regard to that of the shuttle.

The amplitude of this latter vibratory movement is most decidedly less than that of the shuttle, owing to the considerable difference that exists between the mass of the shuttle, on the one hand, and the mass of the frame 50 and the magnetic circuit, on the other hand. Seeing that the frame supporting the magnetic circuit engages the interior of the cover 1 with an easy fit and that the cylinders 47, 47a can be displaced in the sleeves that support them, the oscillations of this frame are not practically transmitted to the external cover and to the members to which it is connected, whose mass is considerable, although this frame is connected to the end plates 2, 3 by the centering springs 52, 53.

So that the frame 50 as well as the magnetic circuit elements 56, 57 that it carries, never run any risk of entering into resonance, the annular cheeks 48, 48a which support the frame, are drilled with holes 49 in which the incompressible fluid contained in the cover 1 is restrained during the movements of the frame, by reason of the relatively small section of these holes.

When the pumping device described above is intended to pump corrosive liquids, it is advantageous that the end plates 2, 3, the pump bodies 10, 11, as well as the other various members that may come into contact with these liquids, should be made of a metal not attacked by the latter, this metal being, for example, stainless steel. In this case, the various washers, such as the washers 30, the packing 22 of the valves as well as the distortable diaphragms 40, are made of synthetic material, such as that known under the name of "Teflon."

The parts arranged in the area enclosed by the cover 1 being only in contact with a well-defined liquid previously selected, such as oil, these parts, and more particularly the washers, can be made in various manners, which enables less expensive materials to be used than those employed for manufacturing the parts in contact with corrosive liquids that are to be pumped.

Seeing that the magnetic circuit is completely immersed in the liquid mass, the calories given off more particularly owing to magnetic losses and joule losses, are absorbed by this liquid, so that there is no risk of the parts in movement heating up, and, furthermore, lubrication is effected automatically.

The liquid contained inside the cover 1 being incompressible and the pump bodies 10 and 11 being placed symmetrically in relation to the transversal axis of the device, the liquids to be put into circulation may be under any kind of pressure without affecting the working of the device, seeing that the pressures exerted by the liquid to be put into circulation, annul themselves.

I claim:

1. An electromagnetically energized mechanism comprising a tubular casing, a slidable body slidably mounted in said casing, spring members interposed at both ends of said body between the latter and said casing, said body having parts constituting a magnetic circuit provided with coil windings, a magnetic armature slidably mounted between said parts constituting the magnetic circuit to be located within the magnetic field created inside said magnetic circuit to reciprocate when said coil windings are energized, spring loaded elements interposed between said body and said armature to give to the latter a determined natural frequency and driven means connected to said armature.

2. An electromagnetically energized mechanism comprising two magnetic cores, each said core having a plurality of notches therein, a carrying body of non magnetizable material connecting said magnetic cores, concentrically disposed coil windings engaged in said notches of each of the magnetic cores, a slidably mounted reciprocable armature inserted between said two magnetic cores, said reciprocable armature having two permanent magnets of opposite polarity respectively located at both ends thereof and in a transverse direction with respect to the axis of said armature and spring loaded members interposed between said carrying body and said armature to maintain the latter when at rest in a position wherein the permanent magnets are respectively disposed on each side of said notches.

3. An electromagnetically energized mechanism comprising two magnetic cores, connecting members of non-magnetic material secured at both ends of said magnetic cores for connection of the latter which extends parallel with respect thereto, said magnetic cores having respectively four notches to define polar surfaces, two coil windings concentrically fitted inside said four notches of each one of said magnetic cores to create therein alternating magnetic fields when supplied with alternating current, a magnetic armature or shuttle inserted between said magnetic cores and slidably carried by said connecting members, said armature being made of non-magnetizable material and provided with two permanent magnets mounted in such a manner that they have their respective ends respectively located near said magnetic cores, said permanent magnets being further spaced one with respect to the other to be placed beyond said notches of said magnetic cores when said coil windings are not energized.

4. An electromagnetically energized mechanism as set forth in claim 3, in which said connecting members for said magnetic cores are provided with tubular projecting portions extending towards said armature provided on both ends with members projecting to at least in part overlap said projecting portions intended to carry and guide said armature when reciprocated.

5. An electromagnetically energized mechanism as set forth in claim 4 comprising further ball bearings inserted between said projecting portions of the connecting members and said members projecting from both ends of said armature.

6. An electromagnetically energized mechanism as set forth in claim 3 comprising further two springs respectively inserted between said armature and each one of said connecting members for said magnetic cores.

References Cited in the file of this patent

UNITED STATES PATENTS

| | | |
|---|---|---|
| 1,301,485 | Mueller | Apr. 22, 1919 |
| 2,338,974 | Schmidt | Jan. 11, 1944 |
| 2,673,522 | Dickey | Mar. 30, 1954 |
| 2,732,807 | Parsegian | Jan. 31, 1956 |
| 2,749,453 | Cassell et al. | June 5, 1956 |
| 2,769,103 | Kristiansen | Oct. 30, 1956 |